US012735933B2

(12) United States Patent
Bartschies

(10) Patent No.: US 12,735,933 B2
(45) Date of Patent: Sep. 15, 2026

(54) DRIVE DEVICE FOR A VEHICLE FLAP

(71) Applicant: Edscha Engineering GmbH, Remscheid (DE)

(72) Inventor: Christian Bartschies, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 485 days.

(21) Appl. No.: 18/224,043

(22) Filed: Jul. 19, 2023

(65) Prior Publication Data

US 2024/0044193 A1 Feb. 8, 2024

(30) Foreign Application Priority Data

Aug. 2, 2022 (DE) ..................... 10 2022 119 396.9

(51) Int. Cl.
*E05F 15/622* (2015.01)

(52) U.S. Cl.
CPC ....... *E05F 15/622* (2015.01); *E05Y 2201/624* (2013.01); *E05Y 2201/636* (2013.01); *E05Y 2900/50* (2013.01); *E05Y 2900/546* (2013.01)

(58) Field of Classification Search
CPC ......................... E05Y 2201/636; E05F 15/622
See application file for complete search history.

(56) References Cited

U.S. PATENT DOCUMENTS 12,467,305 B2 * 11/2025 Gutgesell ................ E05F 15/53
2011/0290576 A1 12/2011 Koestler et al.
2014/0000394 A1 * 1/2014 Anheier ................ F16H 57/033 74/89.29
2014/0270912 A1 * 9/2014 Fischer ................... F16C 11/06 277/300
2015/0240547 A1 * 8/2015 Fischer ............... F16H 25/2418 74/89.4
2016/0153532 A1 * 6/2016 Fischer ................. E05F 15/611 74/89.35
2021/0402953 A1 * 12/2021 Polisetty ................... E05F 1/00
2022/0049533 A1 * 2/2022 Keßler .................. E05F 15/622
2022/0118939 A1 * 4/2022 Pfeifer ..................... B60R 21/38
2024/0200386 A1 * 6/2024 Dornen ................. E05F 15/622
2024/0344379 A1 * 10/2024 Keßler ....................... E05F 1/10
2024/0351552 A1 * 10/2024 Bartschies ............. B62D 25/12
2024/0351553 A1 * 10/2024 Bartschies .............. B60R 21/38
2025/0067109 A1 * 2/2025 Bartschies ............ E05F 15/622

FOREIGN PATENT DOCUMENTS

| | | | |
|---|---|---|---|
| DE | 102018125800 | A1 | 4/2020 |
| DE | 102020101072 | B3 | 5/2021 |
| EP | 2390145 | A1 | 11/2011 |

* cited by examiner

*Primary Examiner* — Brian L Swenson
(74) *Attorney, Agent, or Firm* — Davidson Kappel LLC

(57) ABSTRACT

A drive device for a vehicle flap, and includes a first actuator for opening and closing the vehicle flap. The first actuator has a first end. The drive device also includes a first connection element for connecting the first end of the first actuator to one of the vehicle door and the vehicle body, and a coupling device having at least one first coupling member for coupling the first connection element to the first actuator. The coupling device comprises a second coupling element which is displaceable relative to the first coupling element between a first end position and a second end position.

20 Claims, 5 Drawing Sheets

DRIVE DEVICE FOR A VEHICLE FLAP

BACKGROUND

The present disclosure relates to a drive device for a vehicle flap, comprising a first actuator for opening and closing the vehicle flap, the first actuator having a first end, a first connection element for connecting the first end of the first actuator to one of the vehicle flap and the vehicle body, and a coupling device with at least one first coupling element for coupling the first connection element to the first actuator.

In practice, drive devices for doors of vehicles are known which, in a normal state, enable an opening and closing of a front door via a first actuator between a closed and an open position for maintenance of the vehicle or for luggage loading or luggage unloading.

Furthermore, it is known that the drive device can also be used for implementing a pedestrian protection, in which case the vehicle hood is brought very quickly into a raised pedestrian protection position in the event of a collision with a pedestrian in order to provide a deformation space in a region of the vehicle front. This prevents, in particular, the head of the pedestrian from unabatedly hitting the hard engine block arranged under the front hood.

Due to the fact that the vehicle flap suddenly experiences a displacement during a collision, an inertia as well as a friction of the drive device must no longer decelerate or even block a deployment of the vehicle flap. In general, a particularly fast-acting second actuator is provided for driving the vehicle flap into this pedestrian protection position and is frequently designed as a pyrotechnic actuator. For the combination with a first actuator which is intended for the normal state and is intended for normal opening and closing of the front flap it is problematic that, due to the coupling of the two separately provided actuators via the vehicle flap or the vehicle body, a delay or even partial blocking of the deployment movement in a collision state of the drive device due to the first actuator may occur.

US 2021/0402953 A1 shows a drive device for a vehicle flap, comprising a first actuator for opening and closing the vehicle flap, the first actuator having a first end, on which there is arranged a first connection element, designed as a ball socket, for connection of the first end of the first actuator on one of the vehicle flap and the vehicle body. The first connection element is fixedly connected here at the first end via a connecting portion. The first connection element or the ball socket has a receptacle, in the form of a slot, for a ball pin so that, during a movement of the joint arrangement connected to the vehicle flap, the ball pin is displaced in the receptacle and thus a clearance of the system required to avoid the blocking of the deployment movement is realized.

DE 10 2018 125 800 A1 shows a drive device for a vehicle flap, comprising a first actuator for opening and closing the vehicle flap, the first actuator having a first end. A first connection element is arranged at the first end of the first actuator or is fixedly connected to the first end. On the vehicle flap there is arranged a connecting element, in which a coupling element arranged displaceably in an elongate receptacle is arranged for coupling the first connection element to the vehicle flap. As a result, the first connection element is displaceable relative to the vehicle flap along a longitudinal extent of the elongate receptacle together with the coupling element, so that a displacement of the first actuator relative to the vehicle flap is realized when a pedestrian protection function is triggered.

SUMMARY

It is an object of the present disclosure to provide a drive device which is reliable and compact.

According to the present disclosure, a drive device for a vehicle flap is provided, comprising a first actuator for opening and closing the vehicle flap, the first actuator having a first end, a first connection element for connecting the first end of the first actuator to one of the vehicle flap and the vehicle body, and a coupling device with at least one first coupling element for coupling the first connection element to the first actuator. The drive device is characterized in that the coupling device comprises a second coupling element that is displaceable relative to the first coupling element between a first end position and a second end position. In this way, the distance between the first connection element and the first actuator coupled thereto can advantageously be increased so that a clearance is realized in the drive device, which in particular causes the front flap not to be braked or even blocked by the first actuator in its deployment movement when a pedestrian protection function is triggered. It is further advantageous that an internal mechanism of the first actuator, for example a spindle gear, remains unmoved at the time of the sudden deployment of the front flap and is not exposed to excessive external forces by means of the deployment movement by means of a second actuator. Furthermore, the coupling device of the drive device is advantageously always exchangeable and adaptable, so that a reliable, compact and flexible drive device is provided.

The coupling device expediently comprises at least one first guide element with a guide portion, wherein the second coupling element is displaceable and guided along the guide portion. The first guide element with its guide portion is advantageously used to guide the second coupling element relative to the first coupling element along a defined distance so that, on the one hand, further parts and components are not damaged, and on the other hand, the displacement of the second coupling element during the deployment movement of the vehicle flap is effected without shaking and without wobbling over a defined path so that the vehicle flap can be deployed uniformly and quickly.

Preferably, the first guide element comprises a connecting portion for connection to the first coupling element. Advantageously, the first guide element is designed as an independent component which can be detachably connected to the first coupling element via its connecting portion. The first guide element is thus advantageously easily exchangeable or mountable so that different lengths with respect to the guide portion of the first guide element can be used variably. This ensures a flexible and adjustable drive device, which can advantageously be adapted for a plurality of different vehicle flaps and in each case the required clearance thereof for rapid deployment movement.

According to a preferred embodiment, a thread, in particular an external thread, is provided in the connecting portion. Advantageously, a thread of the connecting portion of the first guide element offers a simple and fast coupling to the first coupling element. In addition, a strength of the connection of the first guide element to the first coupling device is adjustable by means of a torque. Furthermore, a guide portion of the guide element is adjustable via a screw-in depth. Alternatively, an internal thread can also be provided in the connecting portion.

The first coupling element expediently comprises a mating thread, in particular an internal thread, which meshes with the thread of the connecting portion. Advantageously, the first guide element can be screwed into the first coupling element without play, coaxially and concentrically. Advantageously, the mating thread of the first coupling element is provided in a through-bore so that an end face of the first guide element can be screwed in without obstruction. As a result, the guide element is advantageously always orthogonally, coaxially and concentrically connected to the first coupling element. An axial positioning of the guide element in the first coupling element is advantageously defined by means of a first stop portion of the guide element, which abuts against a first end face of the first coupling element. A threaded connection advantageously always provides a simple and rapid assembly, which can also be produced cost-effectively and with high precision.

Preferably, the first guide element has a first end stop which delimits the guide portion on one side and defines the second end position of the second coupling element relative to the first coupling element. Advantageously, the second coupling element is displaceable in a defined manner along the guide portion of the first guide element up to the second end position. Furthermore, the first guide element with its first end stop advantageously ensures a compact design with a stop function with respect to the displacement of the second coupling element. Particularly preferably, the first end stop is formed in one piece with the guide portion of the first guide element. Advantageously, the first end stop offers a high degree of safety and reliability. Furthermore, the first end stop can be produced particularly precisely and cost-effectively.

The second coupling element preferably has a first stop face which abuts against the first end stop of the first guide element in the second end position of the second coupling element. Advantageously, a defined displacement path of the second coupling element is adjustable. Advantageously, the first stop face of the second coupling element and the first end stop of the guide element come into contact in the second end position so that a further displacement of the second coupling element away from the first end position is prevented. In this respect, the coupling device advantageously offers an integrated stop and holding function with regard to the displacement of the second coupling element.

The first coupling element is expediently connected to one of the first connection element and the first end of the first actuator. Advantageously, the first coupling element can be used variably so that the coupling device of the drive device has a high degree of adaptability, as a result of which the drive device is distinguished by a high ease of assembly and a high adaptability.

The second coupling element is expediently connected to the other of the first connection element and the first end of the first actuator. Advantageously, the second coupling element is displaced relative to the first coupling element in the event of an external force between the first connection element and the first end of the first actuator, the external force occurring in particular when the vehicle flap is deployed into a pedestrian protection position. This external force occurs in that the first actuator is connected with both ends via connection elements between the vehicle flap and the vehicle body, so that an increase in the distance of the connection elements is required during a deployment movement of the vehicle flap.

The second coupling element is preferably designed as a hollow cylinder. The shape of a hollow cylinder with respect to the second coupling element advantageously ensures overall a compact design in that the second coupling element designed as a hollow cylinder has different surface portions which fulfill different functions. On the one hand, the second coupling element comprises a coupling portion and, on the other hand, the second coupling element comprises a stop face which, in the second end position, prevents further displacement of the second coupling element away from the first end position.

According to a preferred embodiment, the second coupling element has a fastening portion for connecting the second coupling element to the other of the first connection element and the first end of the first actuator. The fastening portion preferably has a thread, in particular an internal thread. Advantageously, the second coupling element can be easily and quickly mounted via a threaded connection. Furthermore, a thread can be produced cost-effectively and precisely.

The second coupling element expediently bears against the first coupling element in the first end position. Advantageously, the first coupling element and the second coupling element have stop faces which, upon contact, prevent further displacement of the second coupling element in a direction away from the second end position. As a result, the second coupling element is displaceable within the first end position exclusively in one direction towards the second end position. This ensures reliability and compactness.

According to a further preferred embodiment, the first coupling element and the second coupling element are arranged concentrically about a common longitudinal axis. A concentric arrangement advantageously ensures a displacement of the second coupling element relative to the first coupling element free of jamming and also free of canting.

According to a particularly preferred embodiment, the first coupling element and the second coupling element, at least in the first end position, are secured against rotation relative to one another with respect to a rotation about the common longitudinal axis. Advantageously, the coupling device has a rotational lock so that a torque between the first connection element and the first actuator can be transmitted directly via the first coupling element and the second coupling element in the first end position. A radial slipping of the first coupling element relative to the second coupling element is thus advantageously not possible in the normal state of the drive device. In this case, the first actuator generates a force in the normal state for opening and closing the vehicle flap, which force can be transmitted directly and without slip onto the first coupling element and onto the second coupling element without any slipping of the first coupling element relative to the second coupling element, so that a defined displacement of the vehicle flap for opening and closing in the normal state of the drive device is ensured.

According to a preferred embodiment, the first coupling element has at least one first projection on a first end face and the second coupling element has a first recess on a first counter end side, in which first recess the first projection engages in the first end position of the second coupling element. The rotational lock with respect to the first coupling element and the second coupling element advantageously takes place via a releasable plug system which is stable, reliable and compact. A form-fitting and slip-free force transmission is thus advantageously ensured by the rotational lock.

The coupling device preferably comprises a first sealing element. Advantageously, the first sealing element keeps the coupling device free of liquids, undesired particles, dust and other contamination so that a high reliability of the coupling device is always ensured. In particular, a reliable displaceability of the second coupling element is ensured.

The first guide element expediently has a tool attachment. Advantageously, the first guide element is always connectable to and releasable again from the first coupling element reproducibly and with a specific torque with the aid of a torque wrench in order to carry out any maintenance. As a result, a high ease of assembly of the coupling device and a defined mechanical stability of the connection are always ensured.

According to a preferred embodiment, the first actuator comprises a biasing means which biases the second coupling element into the first end position. The biasing means advantageously presses the second coupling element against the first coupling element, so that an opening and closing of the vehicle flap in a normal state, for example for care and maintenance, is ensured perfectly. The biasing means is preferably designed as a spring, in particular as a coil spring.

According to a preferred embodiment, the first coupling element in the first end position sheathes the second coupling element at least in portions. A sheath has the advantage that the second coupling element is mounted in a guided manner within the first end position, so that the second coupling element cannot slip away laterally. Furthermore, the sheath serves to keep away any contamination. Alternatively, it can also be provided that the second coupling element in the first end position surrounds the first coupling element at least in portions.

In an advantageous development, the second coupling element has an insertion bevel. In this case, an upper edge of the second coupling element has a chamfered portion which faces the first coupling portion. This insertion bevel or insertion aid advantageously enables a simple plugging of the first coupling element and of the second coupling element into one another, as a result of which a displaceability of the second coupling element into the first end position without jamming and without canting and an ease of assembly and a reusability are ensured.

According to a preferred embodiment, the first coupling element and the second coupling element are made of a plastics material. Plastics material parts have the advantage that they can be produced cost-effectively in a high number and have a low weight. Furthermore, numerous different forms can be produced when using plastics material with the aid of certain production processes.

Preferably, the first coupling element and the second coupling element are produced by an injection molding process. An injection molding process advantageously provides components in a high number and in a short production time. As a result, an injection molding process is distinguished by economic efficiency and process reliability.

According to an alternative embodiment, the first coupling element and the second coupling element are made of metal. Particularly preferably, the first coupling element and the second coupling element are made from an aluminum alloy. Components made of an aluminum alloy advantageously have a high mechanical stability and a high longevity. Furthermore, components made of an aluminum alloy have a low weight. In addition, components made of an aluminum alloy can be anodized and reused.

Further advantages, features, and developments of the present disclosure emerge from the following description of a preferred embodiment.

BRIEF SUMMARY OF THE DRAWINGS

The present disclosure is explained in more detail below with reference to the accompanying drawings.

DETAILED DESCRIPTION

Figure 1:
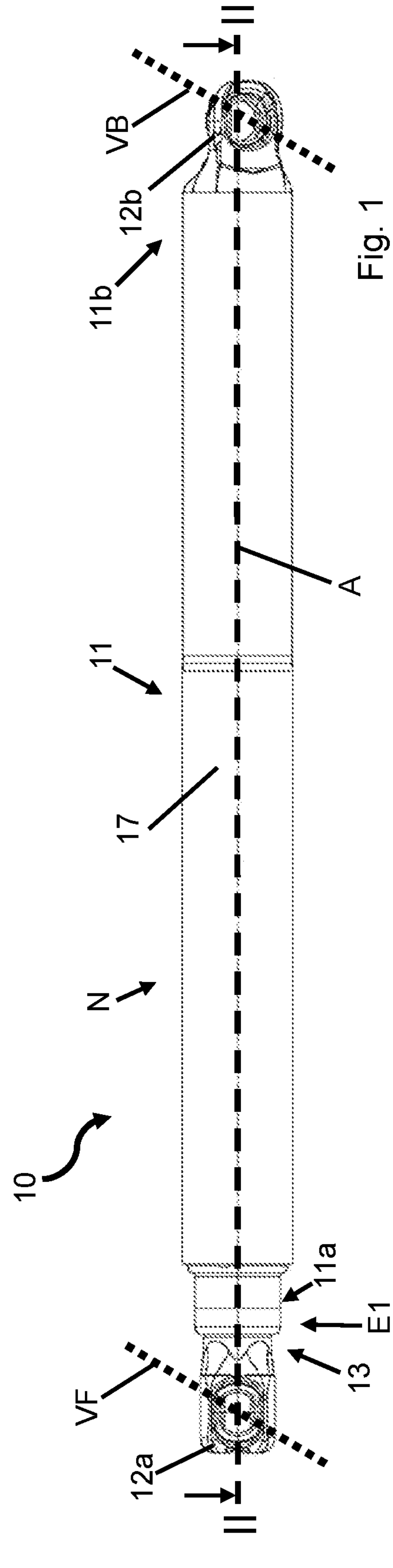
FIG. 1 shows a side view of an exemplary embodiment of a drive device in a normal state.

FIG. 1 shows, in a side view, an exemplary embodiment of a drive device 10 for a vehicle flap VF of a vehicle in a normal state N. The term "normal state" is understood here to mean that the vehicle flap VF is displaceable between an open position and a closed position by the drive device 10. In particular, in the normal state N, the vehicle flap VF is not deployed. The drive device 10 comprises an elongate first cylindrical actuator 11 which extends along a longitudinal axis A and has a housing 17 which has A first end 11*a* and an opposite second end 11*b*.

The housing 17 is designed as a telescopic housing 17 so that the distance between the first end 11*a* and the second end 11*b* of the first actuator 11 is variable. As a result, the vehicle flap VF can be driven between an open and closed position. In this case, the first actuator 11 is coupled at the first end 11*a* to a first connection element 12 a via a coupling device 13. Furthermore, the second end 11*b* of the first actuator 11 is directly coupled to a second connection element 12*b*. Furthermore, the first connection element 12*a* can be coupled articulatedly to the vehicle flap VF of the vehicle and the second connection element 12*b* of the first actuator 11 to the vehicle body VB of the vehicle. In this exemplary embodiment, the first connection element 12*a* and the second connection element 12*b* are designed as ball sockets. Both the vehicle flap VF and the vehicle body VB are shown as dotted lines in FIGS. 1 to 4 for the sake of clarity.

In FIG. 1, the drive device 10 is in a normal state N, in which pedestrian protection is not activated. In the normal state N, the vehicle flap VF is able to be opened or closed in a driven manner relative to the vehicle body VB by means of the drive device 10, for example for the servicing and maintenance of a motor and further peripheral devices.

Figure 2:
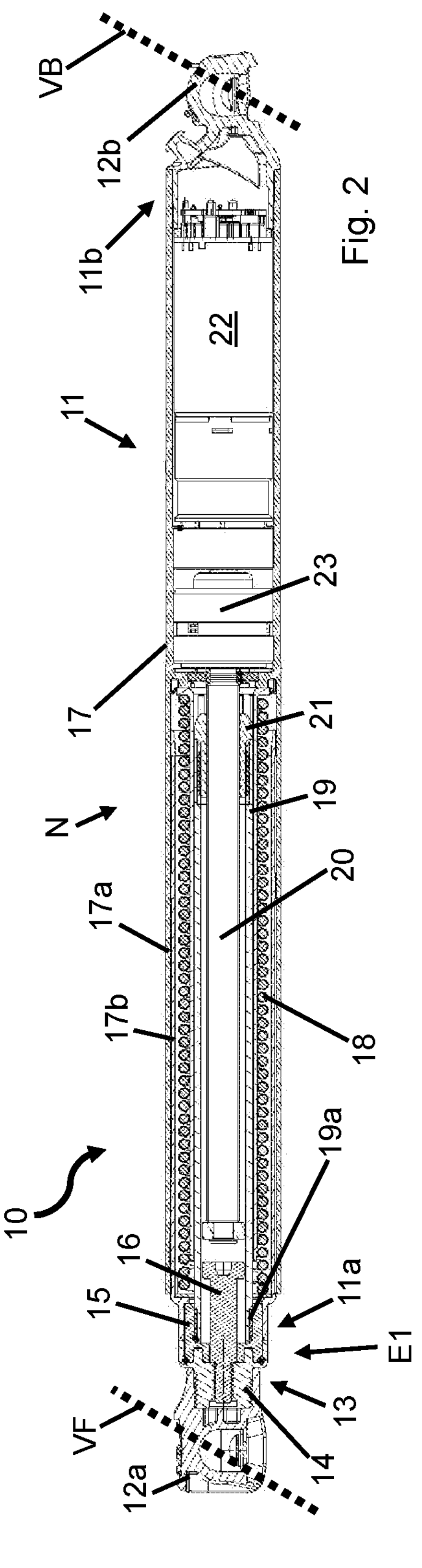
FIG. 2 shows a sectional view of the drive device from FIG. 1.

FIG. 2 shows a sectional view II-II of the drive device 10 from FIG. 1 along the longitudinal axis A of the drive device 10 in the normal state N. Individual components of the drive device 10 are now visible in a region between the first connection element 12*a* and the second connection element 12*b*. The coupling device 13 comprises a first coupling element 14, which is fixedly connected to the first connection element 12*a* via a threaded connection and is thus assigned thereto.

Furthermore, the coupling device 13 comprises a second coupling element 15, which is displaceably arranged relative to the first coupling element 14 along a guide element 16 designed as a bolt. In this case, the second coupling element 15 is connected via a threaded connection to the first end 11*a* of the first actuator 11, the guide element 16 being fixedly connected to the first coupling element 14 via a threaded connection. The second coupling element 15 of the coupling device 13 is thus assigned to the first actuator 11.

The first actuator 11 comprises a cylindrical and tubular, telescopic housing 17 with a first housing part 17*a* and with a second housing part 17*b*, a biasing means 18 designed as a coil spring being arranged in the housing 17 and biasing the housing parts 17*a*; 17*b* in the pull-out direction when the vehicle flap VF is closed. Furthermore, the biasing means 18 radially surrounds a guide tube 19 in which a spindle rod 20 with an external thread is rotatably arranged, the guide tube 19 being formed in one piece with the second housing part 17*b*.

A spindle nut 21 with an internal thread is arranged in a rotationally fixed manner in the guide tube 19, said spindle nut being in threaded engagement with the spindle rod 20, the guide tube 19, when the spindle rod 20 is rotated, being displaceable in a driven manner jointly with the second housing part 17*a* and the spindle nut 21 in a correspondingly linear manner relative to the first housing part 17*a*. As a result, a rotation of the spindle rod 20 causes a displacement of the guide tube 19 so that the second housing part 17*b* is linearly displaceable relative to the first housing part 17*a* telescopically, as a result of which a vehicle flap VF, which is connected articulatedly via the first connection element 12*a*, is displaceable in a driven manner in relation to a vehicle body VB, which is coupled articulatedly to the second end 11*b* of the first actuator 11, between an open and closed position.

Furthermore, the first actuator 11 comprises a motor 22, which is arranged in the housing 17 and is provided for driving the rotational movement of the spindle rod 20. A torque limiter 23 is arranged axially between the motor 22 and the spindle rod 20 and can bring about a decoupling between the motor 22 and the spindle rod 20 when a threshold value of the torque is exceeded between them. It is hereby advantageously ensured in particular that the vehicle flap VF is also movable manually or no damage to the first actuator 11 occurs in the event of external forces on the vehicle flap VF.

In this exemplary embodiment shown in FIG. 2, the guide tube 19 has an external thread 19*a* in a region of the first end 11*a* of the first actuator 11. The second coupling element 15 of the coupling device 13 is connected to this external thread 19*a*. Advantageously, the biasing means 18 biases the second coupling element 15 in the direction of the first coupling element 14 so that the second coupling element 15 is pretensioned in the normal state N of the vehicle into a first end position E1.

Figure 3:
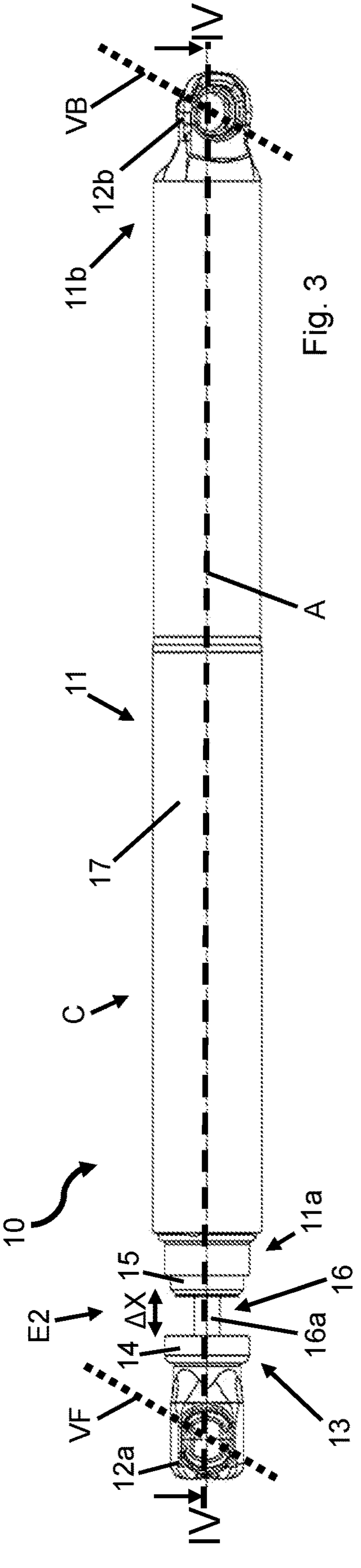
FIG. 3 shows a side view of an exemplary embodiment of the drive device in a collision state.
Figure 4:
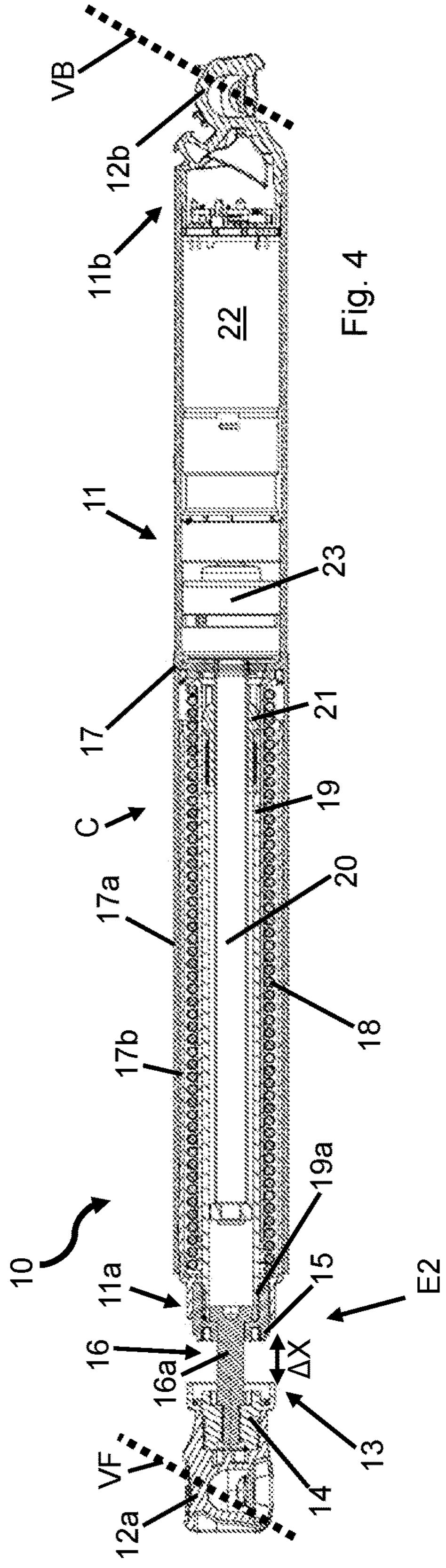
FIG. 4 shows a sectional view of the drive device from FIG. 3.

FIG. 3 and FIG. 4 show the drive device 10 according to FIG. 1 and FIG. 2 in a collision state C. In the collision state C, a pedestrian protection of the vehicle has been activated, the vehicle flap VF having been suddenly moved into a deployed position by means of a second actuator, which is not shown here. Since the first actuator 11 is arranged between the vehicle flap VF and the vehicle body VB and, due to the deployed position of the vehicle flap VF enforced by the second actuator relative to the vehicle body VB, an axial force is generated in the pull-out direction between the first connection element 12*a* and the second connection element 12*b*. Due to this external axial force, the second coupling element 15 is displaced along a guide portion 16*a* of the guide element 16 from the first end position E1 into the second end position E2. Thus, the coupling device 13 can assume two different states, namely a first state, which is provided in the normal state N of the drive device 10, and a second state, which is provided in the collision state C of the drive device 10, in the second state the distance between the first connection element 12*a* and the second connection element 12*b* having been increased by a length ΔX. This length corresponds to the clearance which is required so that a rapid state change of the drive device 10 from the normal state N into the collision state C is possible. It is important here that, in particular, it is avoided that a fast state change is hindered due to the internal inertia of the first actuator 11 or that also the first actuator is damaged due to the external forces occurring.

Figure 5:
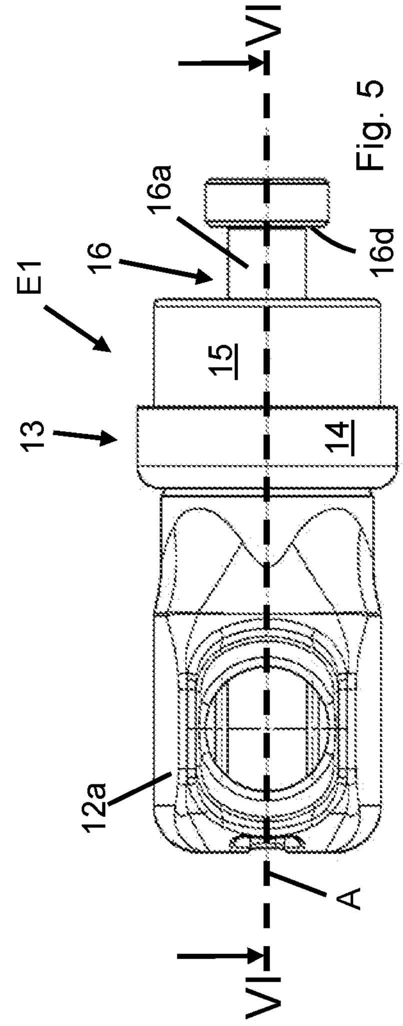
FIG. 5 shows a side view of an exemplary embodiment of a coupling device.

FIG. 5 shows the coupling device 13 in a disassembled state. The coupling device 13 is shown in the first state in which the second coupling element 15 is located in the first end position E1. In the first end position E1, the first coupling element 14 is directly in contact with the second coupling element 15 of the coupling device 13. Furthermore, FIG. 5 shows a first end stop 16*d* of the first guide element 16, which is designed as a bolt. The first end stop 16*d* is designed as a head of the bolt, which is arranged directly adjacent to the guide portion 16*a* of the first guide element 16.

Figure 6:
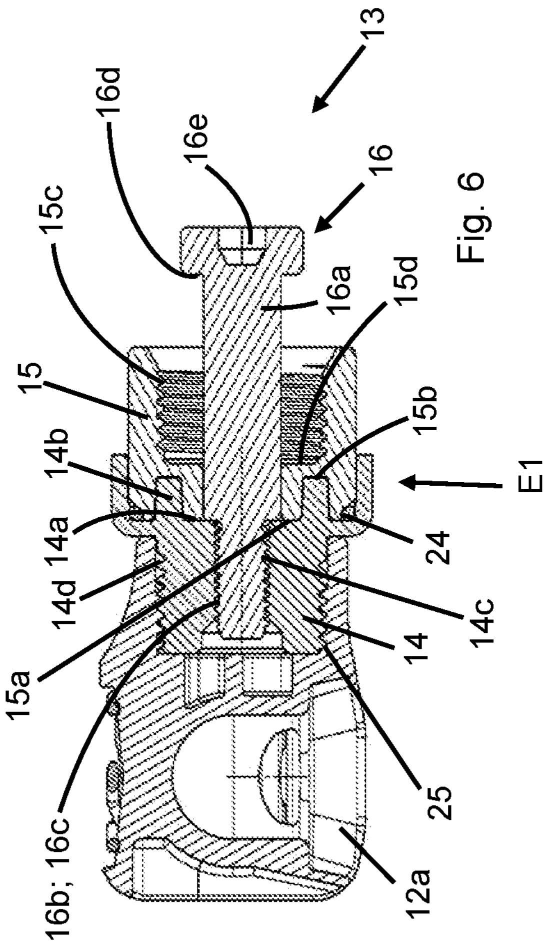
FIG. 6 shows a sectional view of the coupling device from FIG. 5.

FIG. 6 shows a sectional view IV-IV of the coupling device 13 of FIG. 5. The first connection element 12*a* has a threaded bore 25, in which the first coupling element 14 is screwed. For this purpose, the first coupling element 14 has an external thread 14*d*. On a side facing away from the first connection element 12*a*, the first coupling element 14 has a first end face 14*a*, on which a first projection 14*b* is formed.

The second coupling element 15 has a first counter end face 15*a* facing the first end face 14*a*, a first recess 15*b* being provided on the first counter end face 15*a*. The first projection 14*b* of the first coupling element 14 engages in the first recess 15*b* of the second coupling element 15 so that a rotational lock of the first coupling element 14 relative to the second coupling element 15 is hereby provided.

The second coupling element 15 is designed as a hollow cylinder, the second coupling element 15 having an internal thread 15*c* which is arranged facing away from the counter end side 15*a* and is provided for a connection with the first end 11*a* of the first actuator 11. In the first end position E1 of the second coupling element 15, the first end face 14*a* of the first coupling element 14 and the first counter end face 15*a* of the second coupling element 15 are biased towards each other by means of the biasing means 18 of the first actuator 11. Advantageously, the second coupling element 15 has a first stop face 15*d*, which can be brought into contact with a first end stop 16*d* of the first guide element 16.

The first guide element 16 has a total of three segments. The first segment is a connecting portion 16*b* which can be screwed into the threaded bore 14*c* of the first coupling element 14 via a thread 16*c* provided in the connecting portion 16*b*, a screw-in depth of the connecting portion 16*b* of the first guide element 16 being limited by the guide portion 16*a* having a larger outer diameter than the connecting portion 16*b*. The second segment of the first guide element 16 is the guide portion 16*a*, along which the second coupling element 15 can be displaced in a controlled manner. The third segment of the first guide element 16 is the first end stop 16*d*, in the region of which a tool attachment 16*e* is arranged. The tool attachment 16*e* has a depression with a hexagon profile (hexagon socket). The tool attachment 16*e* makes it easier for the first guide element 16 to be screwed into and out of the first coupling element 14.

Furthermore, FIG. 6 shows a first sealing element 24, which is designed as an O-Ring and is produced in particular from a plastics material. The sealing element 24 is arranged bearing flat against the first end face 14*a* of the first coupling element 14.

Figure 7:
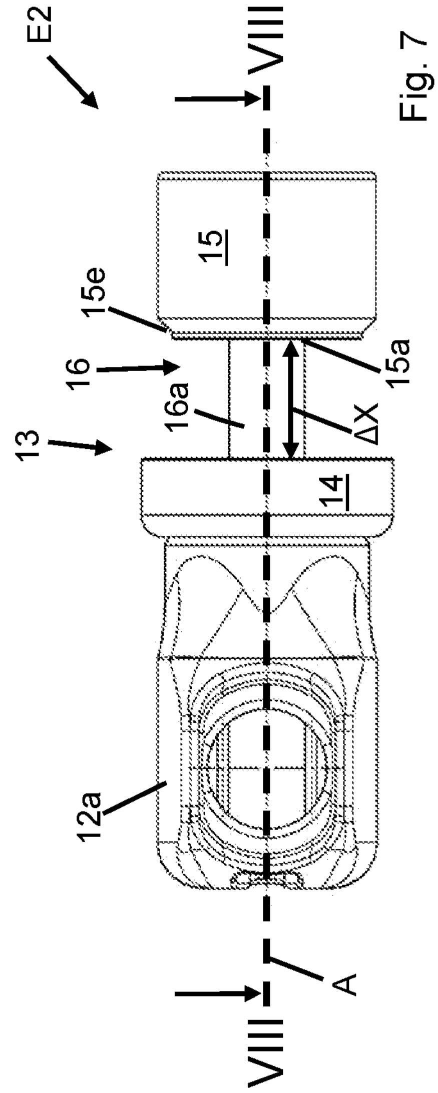
FIG. 7 shows a side view of an exemplary embodiment of a coupling device.

FIG. 7 shows the coupling device 13 from FIG. 3. The coupling device 13 is shown in the second state, which corresponds to an activated pedestrian protection, in which the vehicle flap VF is raised relative to the vehicle body VB. The second coupling element 15 has been displaced by a distance with the length ΔX away from the first coupling element 14 into the second end position E2. Furthermore, an insertion bevel of the second coupling element 15 is now visible and allows a displacement of the 15*e* second coupling element 15 back into the first end position E1 without jamming and without canting.

Figure 8:
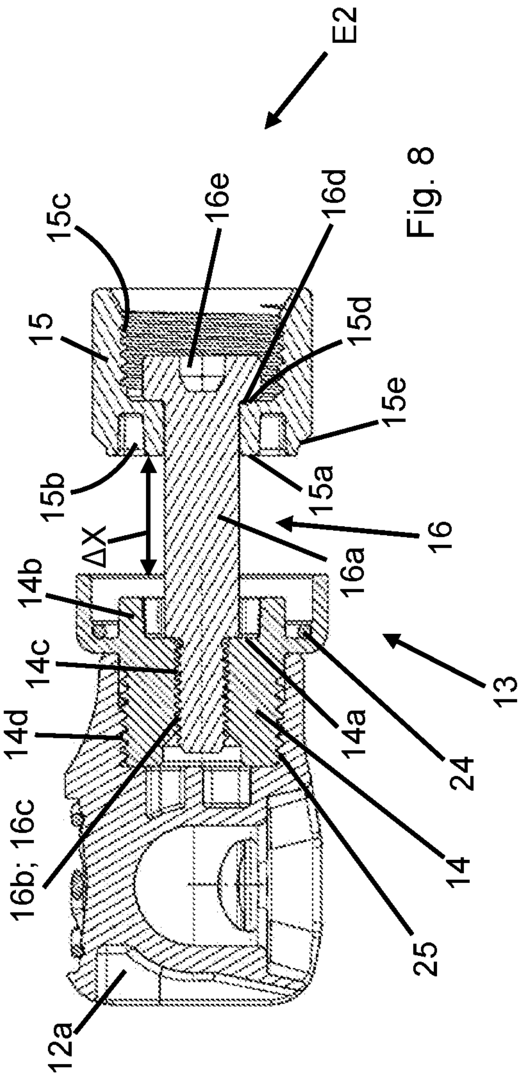
FIG. 8 shows a sectional view of the coupling device from FIG. 7.

FIG. 8 shows a sectional view VIII-VIII of the coupling device 13 of FIG. 7. As described above, the second coupling element 15 has now been displaced by the distance of the length ΔX with respect to the first coupling element 14. In the second end position E2, the second coupling element 15 abuts against the first end stop 16*d* of the first guide element 16 with the stop face 15*d* so that a further displacement of the second coupling element 15 in a direction away from the first coupling element 14 is not possible. As a result, the first end stop 16*d* of the first guide element 16 defines the possible length ΔX of the displaceable path of the second coupling element 15.

Figure 9:
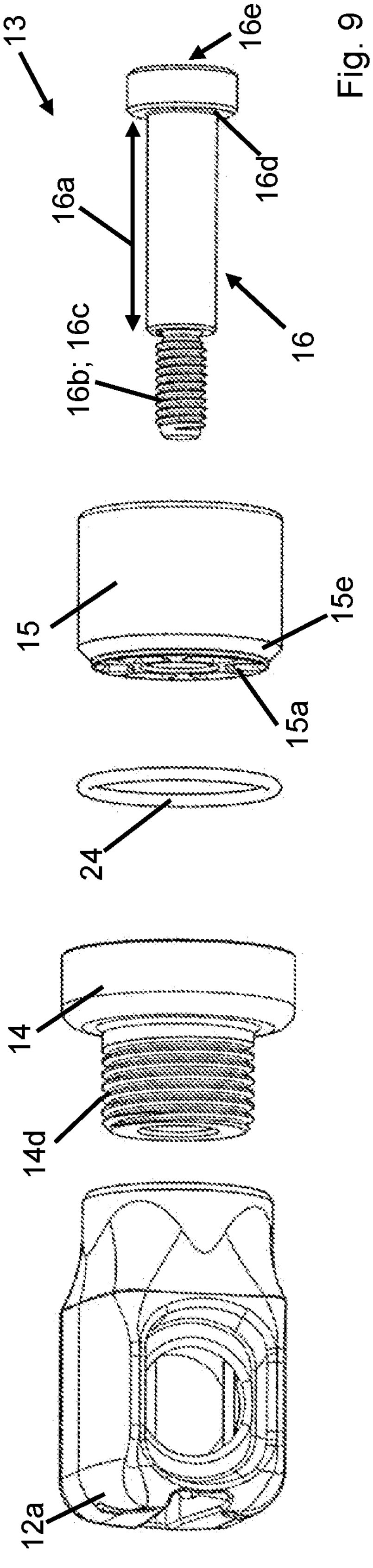
FIG. 9 shows, in a perspective view, an exploded illustration of the coupling device from FIG. 5-FIG. 8.

FIG. 9 shows the first connection element 12*a* and the individual components of the coupling device 13 in an exploded view. For mounting the individual components, first the first coupling element 14 with the external thread 14*d* is screwed into the first connection element 12*a* up to a stop. The first sealing element 24 is then inserted flat into the first coupling element 14 at the end face and the second coupling element 15 is inserted into the first coupling element 14 so that the first end face 14*a* of the first coupling element 14, which is hidden here, and the first counter end face 15*a* of the second coupling element 15 lie on top of one another.

In a further step, the first guide element 16 is guided through an opening in the second coupling element 15 and then the thread 16*c* of the connecting portion 16*b* of the first guide element 16 is screwed into the threaded bore 14*c* of the first coupling element 14. As a result, the second coupling element 15 is now displaceable along the guide portion 16*a* of the first guide element 16. The external thread 19*a* of the first actuator 11 shown in FIG. 2 can finally be coupled to the internal thread 15*c*, that is covered here, of the second coupling element 15. In the exemplary embodiment present here, the second coupling element 15 is screwed to the guide tube 19 of the first actuator. In order to ensure particularly stable and long-lasting screw connections, all threaded portions of the coupling device 13 can be coated with a threaded adhesive before assembly.

Figure 10:
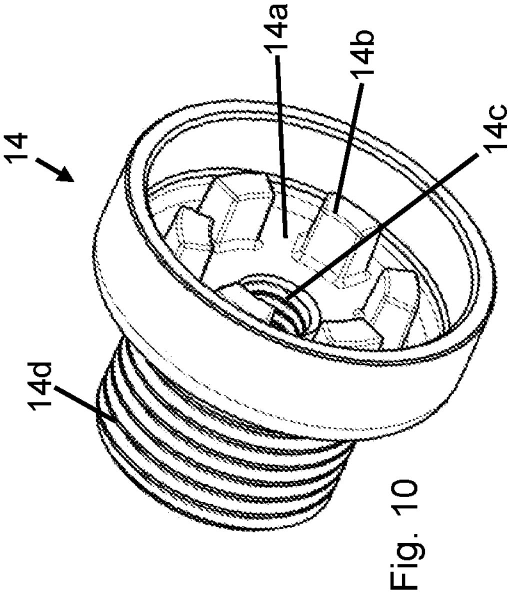
FIG. 10 shows, in an enlarged perspective view, a first coupling element 14 from FIG. 9.

FIG. 10 shows, in an enlarged perspective view, the first coupling element 14. It can be clearly seen in this view that the first end face 14*a* of the first coupling element 14 has, by way of example, multiple projections 14*b* which are arranged along a perforated circle.

Figure 11:
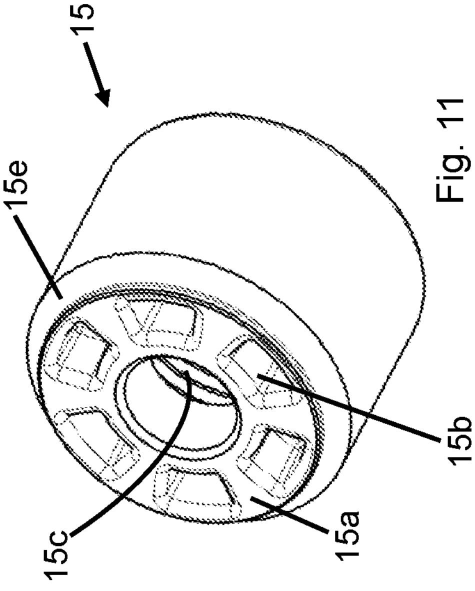
FIG. 11 shows, in an enlarged perspective view, a second coupling element 15 from FIG. 9.

FIG. 11 shows, in an enlarged perspective view, the second coupling element 15. It can be clearly seen in this view that the first counter end face 15*a* of the second coupling element 15 has, by way of example, multiple recesses 15*b*, which are arranged along a perforated circle.

The first coupling element 14 and the second coupling element 15 can be connected to one another in a rotationally fixed manner via the projections 14*b* and recesses 15*b*, respectively, so that a form-fitting and slip-free rotational lock in the first end position E1 of the second coupling element 15 is always ensured.

The mode of operation of the exemplary embodiment of the drive device 10 shown here will now be explained with reference to FIGS. 2 and 4: In the normal state N of the drive device 10 shown in FIG. 2, the drive device 10 serves to open and close the vehicle flap VF by a user. In the normal state N, the coupling device 13 is always in the first state, in which the second coupling element 15 is arranged in the first end position E1.

In the event of a collision of the vehicle with, for example, a pedestrian, certain sensors of the vehicle activate a second pyrotechnic actuator, which is not shown here. As a result of the activation of the second pyrotechnic actuator, the vehicle flap VF is raised suddenly by a defined path, so that the drive device 10 is now located in the collision state C shown in FIG. 4.

For this direct lifting to be carried out without disruptive effects, the drive device 10 has the coupling device 13 with the displaceable coupling element 15. In the collision state C of the drive device 10, the second coupling element 15 has been moved into the second end position E2 so that the distance between the first connection element 12*a* and the second connection element 12*b* has been increased suddenly. In this case, the second coupling element 15 is connected to the first end 11*a* of the first actuator 11 of the drive device 10.

The second coupling element 15, which is coupled only via a plug connection to the first coupling element 14, has been pulled out of the first coupling element 14 and displaced by the distance of length ΔX until the second coupling element 15 abuts with its first stop face 15*d* against the first end stop 16*d* of the first guide element 16 into the second end position E2.

Because the first actuator 11 comprises a biasing means 18 designed as a coil spring, which permanently biases the second coupling element 15 towards the first coupling element 14, the biasing means 18 moves the second coupling element 15 back from the second end position E2 into the first end position E1. Lastly, the change in length of the first actuator 11 required by the deployment movement of the vehicle flap VF is hereby carried out subsequently to the deployment movement, while the deployment movement is not prevented by the inertia of the first actuator 11. The displaceable second coupling element 15 makes it possible, namely, for the distance between the first connection element 14 and the second connection element 15 to be able to be increased quickly by the clearance of the length ΔX without greater counterforce.

The present disclosure has been explained above with reference to an exemplary embodiment in which the second coupling element 15 is coupled via a threaded connection to the guide tube 19; 19*a* of the first actuator 11 and the first coupling element 14 is coupled to the first connection element 12*a* via a threaded connection. It is understood that, conversely, the second coupling element 15 can also be coupled to the first connection element 12*a* and the first coupling element 14 to the guide tube 19; 19*a* of the first actuator 11. In the case of the present disclosure, it is necessary for the second coupling element 15 to be displaceable relative to the first coupling element 14, so that the distance between the first connection element 12*a* and the first actuator 11 is variable by the displacement.

What is claimed is:

1. A drive device for a vehicle flap, comprising a first actuator for opening and closing the vehicle flap, the first actuator having a first end, a first connection element for connecting the first end of the first actuator to one of the vehicle flap and vehicle body, a coupling device having at least one first coupling element for coupling the first connection element to the first actuator, the coupling device comprising a second coupling element, which is displaceable relative to the first coupling element between a first end position and a second end position, wherein in an assembled state of the drive device, in which the first actuator is coupled to said first connection element, a distance between the first connection element and the first actuator is increasable.

2. The drive device according to claim 1, wherein the coupling device comprises at least one first guide element with a guide portion, wherein the second coupling element is displaceable and guided along the guide portion.

3. The drive device according to claim 2, wherein the first guide element comprises a connecting portion for connection to the first coupling element.

4. The drive device according to claim 3, wherein a thread is provided in the connecting portion.

5. The drive device according to claim 4, wherein the first coupling element comprises a mating thread which meshes with the thread of the connecting portion.

6. The drive device according to claim 5, wherein the mating thread of the first coupling element is provided in a through-bore.

7. The drive device according to claim 5, wherein the first guide element has a first end stop, which delimits the guide portion on one side and defines the second end position of the second coupling element relative to the first coupling element.

8. The drive device according to claim 7, wherein the first end stop is formed in one piece with the guide portion of the first guide element.

9. The drive device according to claim 8, wherein the second coupling element is connected to the other of the first connection element and the first end of the first actuator.

10. The drive device according to claim 7, wherein the second coupling element has a first stop face, which abuts against the first end stop of the first guide element in the second end position of the second coupling element.

11. The drive device according to claim 2, wherein the first guide element has a tool attachment.

12. The drive device according to claim 1, wherein the second coupling element is designed as a hollow cylinder.

13. The drive device according to claim 1, wherein the second coupling element expediently bears against the first coupling element in the first end position.

14. The drive device according to claim 1, wherein the coupling device preferably comprises a first sealing element.

15. The drive device according to claim 1, wherein the first actuator comprises a biasing means which biases the second coupling element into the first end position.

16. A drive device for a vehicle flap, comprising a first actuator for opening and closing the vehicle flap, the first actuator having a first end, a first connection element for connecting the first end of the first actuator to one of the vehicle flap and vehicle body, a coupling device having at least one first coupling element for coupling the first connection element to the first actuator, the coupling device comprising a second coupling element, which is displaceable relative to the first coupling element between a first end position and a second end position, wherein the first coupling element is connected to one of the first connection element and the first end of the first actuator, wherein the second coupling element has a fastening portion for connecting the second coupling element to the other of the first connection element and the first end of the first actuator, and wherein fastening portion has a thread.

17. A drive device for a vehicle flap, comprising a first actuator for opening and closing the vehicle flap, the first actuator having a first end, a first connection element for connecting the first end of the first actuator to one of the vehicle flap and vehicle body, a coupling device having at least one first coupling element for coupling the first connection element to the first actuator, the coupling device comprising a second coupling element, which is displaceable relative to the first coupling element between a first end position and a second end position, wherein the first coupling element and the second coupling element are arranged concentrically about a common longitudinal axis, wherein the first coupling element and the second coupling element, at least in the first end position, are secured against rotation relative to one another with respect to a rotation about the common longitudinal axis.

18. The drive device according to claim 17, wherein the first actuator comprises a biasing means which biases the second coupling element into the first end position, wherein the second coupling element expediently bears against the first coupling element in the first end position.

19. The drive device according to claim 17, wherein the second coupling element expediently bears against the first coupling element in the first end position.

20. The drive device according to claim 17, wherein the first actuator comprises a biasing means which biases the second coupling element into the first end position.

* * * * *